United States Patent Office 3,454,558
Patented July 8, 1969

3,454,558
METHOD FOR INHIBITING AUTOPOLYMERIZATION OF N-VINYL LACTAMS
Clarence Richard Stahl, Easton, Pa., and Sidney Siggia, Orange, Conn., assignors to GAF Corporation, a corporation of Delaware
No Drawing. Filed July 25, 1963, Ser. No. 297,686
Int. Cl. C07d 27/08, 29/22, 41/06
U.S. Cl. 260—239.3                  10 Claims

ABSTRACT OF THE DISCLOSURE

This invention relates to a new method for inhibiting the autopolymerization of N-vinyl lactams, and relates more specifically to inhibiting the autopolymerization of N-vinyl lactams by incorporating relatively small amounts of ammonia or an organic amine into the monomeric lactams in the absence of a peroxide catalyst.

---

N-vinyl lactams, such as 1-vinyl-2-pyrrolidone, undergo autopolymerization even at ambient temperatures, this being indicated by an undesirable discoloration of the monomeric mass, and in extreme cases, by an increase in the viscosity of the monomer and/or the formation of a hard, solid mass of polymer. The autopolymerization of such N-vinyl lactams is accelerated with increasing temperature and, consequently, the problems attendant autopolymerization thereof are aggravated during the summer months and, more importantly, by attempts to distill crude N-vinyl lactams to obtain a relatively pure monomer.

One means for inhibiting the autopolymerization involves refrigerating the N-vinyl lactam monomer until the time of its contemplated usage. This technique has not proven satisfactory, however, due to the relatively high equipment and operating expenses entailed therein.

Another technique for inhibiting the undesired autopolymerization of N-vinyl lactams involves the utilization of compounds which function as stabilizers. The presence of stabilizers heretofore available in subsequent catalyzed polymerizations of an N-vinyl lactam, however, is detrimental and consequently it is necessary to effect the removal of the stabilizer preliminary to such polymerizations. The use of a distillation method for effecting the separation of the stabilizer is unsuitable for the reason mentioned above and alternative separation methods necessarily involve additional expenditures.

The use of insoluble stabilizers has the advantage that the removal may be effected by merely decanting the monomer prior to polymerization. However, the utilization of such stabilizers is not completely satisfactory since an additional removal step still is required and ultimate yields are diminished due to losses of monomeric product which remain in the solid stabilizer.

Accordingly, it is a primary object of this invention to provide a method for inhibiting the autopolymerization of an N-vinyl lactam which is simpler and more economical than techniques heretofore available.

It is another object of the present invention to provide a method for inhibiting the autopolymerization of an N-vinyl lactam which does not require the utilization of expensive refrigeration equipment and operations.

It is an additional object of the present invention to provide a method for inhibiting the autopolymerization of an N-vinyl lactam which does not entail the utilization of a compound functioning as a stabilizer and so characterized that it must be removed prior to contemplated catalyzed polymerizations of the monomer.

A further object of the present invention is to provide a method for stabilizing an N-vinyl lactam monomer towards autopolymerization wherein a substance is employed as a stabilizer which does not interfere with subsequent catalytic polymerization of the monomer but, on the contrary, acts as an activator for such polymerization processes.

Other objects and advantages of the instant invention will be apparent from the following detailed description.

Monomeric N-vinyl lactams such as 1-vinyl-2-pyrrolidone are conventionally polymerized by heating the monomer in the presence of a free radical-supplying catalyst, such as hydrogen peroxide, benzoyl peroxide, potassium persulfate, potassium perborate, peracetic acid, perbenzoic acid, and the like. Conventional polymerization techniques, exemplified by Patent No. 2,634,259 to Ney et al. and Patent No. 2,665,271 to Beller, make use of ammonia or an organic amine to activate such catalyzed reactions.

The present invention is based upon a finding that in the absence of such free radical-supplying catalysts ammonia and organic amines, heretofore considered only as activators for the polymerization of N-vinyl lactams in the presence of a peroxide or other free radical-supplying catalyst, function as highly effective inhibitors to the autopolymerization of the N-vinyl lactams.

Broadly described, the present invention provides a method for inhibiting the autopolymerization of an N-vinyl lactam monomer which comprises adding to said monomer in the absence of a free radical-supplying polymerization catalyst at least about 0.005% by weight of a stabilizing agent selected from the group of compounds consisting of ammonia and organic amines, said organic amines being characterized by the ability to function as activators in polymerizations carried out utilizing catalysts of said free radical-supplying type.

The use of the materials employed in accordance with the present method to stabilize the monomer has the apparent decided advantage over stabilizers employed heretofore in that the stabilized monomeric N-vinyl lactam may be polymerized, when desired, by simply adding an appropriate free radical-supplying catalyst. Thus, the present method simply and economically carries out the desired stabilization of the N-vinyl lactam monomer and is entirely free from the problems, in terms of monomer contamination, monomer loss, and supplemental equipment and operating expenditures, which characterize techniques of similar purpose heretofore available.

The N-vinyl lactams contemplated to be treated in accordance with the present invention include any N-vinyl lactams exhibiting autopolymerization tendencies. The present invention is particularly useful in treating N-vinyl lactams corresponding to the general formula:

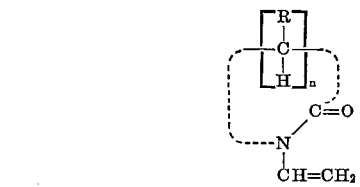

wherein $n$ represents an integer selected from the group consisting of 3, 4 and 5, and R is selected from the group consisting of hydrogen and lower alkyl, i.e., methyl, ethyl, propyl, isopropyl, butyl and the like. Specific examples of such N-vinyl lactam monomers include, without limitation, N-vinyl pyrrolidone, N-vinyl-5-methyl pyrrolidone, N-vinyl-5-ethyl pyrrolidone, N-vinyl-3,3-dimethyl pyrrolidone, N-vinyl-3-methyl pyrrolidone, N-vinyl-4-methyl pyrrolidone, N-vinyl-4-ethyl pyrrolidone, N-vinyl caprolactam, and N-vinyl piperidone.

The stabilizing agents preferred for utilization in the present method are represented by the general formula:

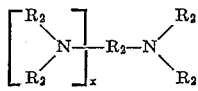

wherein $R_2$ is selected from the group consisting of hydrogen, alkyl having from 1 to about 8 carbon atoms, hydroxyalkyl having from 1 to about 8 carbon atoms, cycloalkyl having from 3 to about 8 carbon atoms, phenyl, and lower alkyl phenyl; $x$ is an integer selected from the group consisting of 0 and 1; $R_1$ is $R_2$ when $x$ is 0, and $R_1$ is selected from the group consisting of alkylene having from 2 to about 6 carbon atoms and phenylene when $x$ is 1.

Specific examples of suitable stabilizing agents include, without limitation, ammonia, methyl amine, ethyl amine, dimethyl amine, diethyl amine, i-propyl amine, n-hexyl amine, methyl n-butyl amine, ethyl n-hexyl amine, trimethyl amine, triethyl amine, tripropyl amine, ethanol amine, diethanol amine, triethanol amine, β-hydroxyethyl butyl amine, aniline, p-methylaniline diphenyl amine, methyl phenyl amine, diethyl phenyl amine, cyclohexylamine, ethyl cyclopentyl amine, ethylene diamine, tetraethyl ethylene diamine, p-phenylene diamine, N,N'-dimethyl-p-phenylene diamine, and the like.

It is known, as exemplified by PB Report No. 25,652, that the activating effect of amines in the presence of free radical-supplying catalysts is inversely proportional to their molecular weight. Advantageously, it also has now been found that ammonia and the lower molecular weight amines are the more effective stabilizing agents when employed in the present method. The amines more particularly preferred as stabilizes in the instant invention are ammonia and the lower alkyl monoamines including mono-, di-, and trialkyl monoamines having from 1 to about 4 carbon atoms.

In accordance with the present method ammonia may be added to the N-vinyl lactam in the form of ammonia gas, ammonium hydroxide, and ammonium salts, such as ammonium chloride, sulfate, carbonate, acetate, and the like. The amines employed in the present method similarly may be added to the N-vinyl lactam monomer as free amines or in the form of their respective chloride, bromide, sulfate, acetate and the like salts. The terms "ammonia" and "amine" as employed herein in the specification and claims are intended to refer to the addition of ammonia and the amines in any of the above-described forms.

The actual amount of the stabilizing agent employed in accordance with the present invention usually corresponds to the amount which normally would be used to activate a free radical-supplying catalyst in subsequent polymerizations carried out thereon. In preferred embodiments of the invention, the amount of the stabilizing agent utilized is in the range of from about 0.05 to about 5%, more preferably from about 0.1 to about 2%, by weight of the N-vinyl lactam monomer.

The following examples will serve to illustrate specific embodiments of the method of the invention. It will be understood, however, that the examples are given merely for illustration purposes and not by way of limitation.

EXAMPLE I

Six samples of freshly distilled 1-vinyl-2-pyrrolidone monomer, one free from stabilizing agent and the other five containing ammonia in the amounts indicated in Table 1 below, were prepared and stored in sealed glass bottles at room temperature. The ammonia was added in the form of ammonium hydroxide.

The samples were inspected monthly for evidence of polymer formation. The results of the tests are set forth below in Table 1.

TABLE I

| Sample: | Inhibitor (percent) by weight in terms of $NH_3$ | Storage Period, Months | | |
|---|---|---|---|---|
| | | 1 | 3 | 8 |
| 1 (control) | None | + | + | + |
| 2 | 0.01 | − | + | + |
| 3 | 0.05 | − | − | − |
| 4 | 0.1 | − | − | − |
| 5 | 0.5 | − | − | − |
| 6 | 1.0 | − | − | − |

+ indicates discoloration and/or polymer formation.
− indicates sample is clear and exhibits no discoloration.

It can be seen from the above data that the use of as little as 0.01% by weight ammonia exhibits excellent stabilization of 1-vinyl-2-pyrrolidone towards autopolymerization over appreciable time periods of up to about 3 months at room temperature, while the use of at least 0.05% by weight ammonia advantageously effects the desired stabilization for periods of over 8 months at room temperature.

EXAMPLE II

To compare the inhibiting properties of inorganic alkali metal bases on the autopolymerization of 1-vinyl-2-pyrrolidone with those of ammonia, the general procedure of Example I was repeated with the exception of adding 0.1% by weight of sodium hydroxide to a sample of the 1-vinyl-2-pyrrolidone. At the end of one month the sodium hydroxide-containing samples was slightly discolored and contained a trace of polymer. From this test it can be seen that the agents of the present invention are far superior to the inorganic alkali metal bases in inhibiting the autopolymerization of N-vinyl lactams.

EXAMPLE III

To demonstrate the stabilizing characteristics of the agents of the present invention at elevated temperatures, three samples of the 1-vinyl-2-pyrrolidone monomer containing 0.3, 0.5 and 0.8% by weight of ammonia, respectively, were prepared by the addition of ammonium hydroxide to the monomer samples. Each of the ammonia-treated samples and a control sample free of any inhibitor were sealed in test bottles, and the bottles were placed in a circulating air oven maintained at about 100° C. At the end of a 24-hour time period the bottles were then removed from the heated oven and inspected. The control sample was discolored and contained an appreciable amount of polymer, but the samples containing ammonia were clear and evidenced no polymer formation.

EXAMPLE IV

The procedure of Example II was repeated with the exceptions of substituting each, in turn, of methyl amine, ethylene diamine, tripropyl amine, diethylamine, triethylamine, n-butyl amine, ethanolamine, n-hexylamine, cyclohexylamine, aniline, and phenylene diamine for ammonia. At the end of the 24-hour heating period, the amine-containing samples gave no indication of polymer formation.

It can be seen from the above tests that small amounts of ammonia, alphatic or aromatic amines added to the monomeric N-vinyl lactams in accordance with the present method effectively inhibit autopolymerization of the treated monomer.

Addition of hydrogen peroxide to the monomers tested above, inhibited in accordance with the present invention, advantageously initiated polymerization in the normal manner without the necessity of having to effect the removal of the inhibitor additive.

Additional embodiments and modifications of the method of the present invention will be apparent to one skilled in the art from the general descriptions and examples given hereinabove, and it will be understood that it is intended that the invention be limited only by the scope of the appended claims.

What is claimed is:

1. A method of inhibiting the autopolymerization of an N-vinyl lactam monomer corresponding to the formula

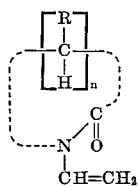

wherein $n$ represents an integer selected from the group consisting of 3, 4 and 5, and R is selected from the group consisting of hydrogen and lower alkyl, which monomer is free of a free radical-supplying polymerization catalyst, which comprises adding to said monomer at least about 0.005% by weight of said monomer of a stabilizing agent of the formula

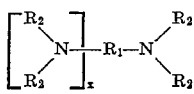

wherein $R_2$ is selected from the group consisting of hydrogen, alkyl having from 1 to about 8 carbon atoms, hydroxyalkyl having from 1 to about 8 carbon atoms, cycloakyl having from 3 to about 8 carbon atoms, phenyl, and lower alkyl phenyl; $x$ is an integer selected from the group consisting of 0 and 1; $R_1$ is $R_2$ when $x$ is 0, and $R_1$ is selected from the group consisting of alkylene having from 2 to about 6 carbon atoms and phenylene when $x$ is 1.

2. The method according to claim 1 wherein $x$ is 0 and $R_1$ is selected from the group consisting of hydrogen and alkyl having from 1 to about 4 carbon atoms.

3. The method according to claim 1 wherein said stabilizing agent is ethylenediamine.

4. The method according to claim 1 wherein said stabilizing agent is aniline.

5. The method according to claim 1 wherein said stabilizing agent is p-phenylenediamine.

6. The method according to claim 2 wherein said stabilizing agent is ammonia.

7. The method according to claim 2 wherein said stabilizing agent is a monoalkyl amine.

8. The method according to claim 2 wherein said stabilizing agent is a dialkylamine.

9. The method according to claim 2 wherein said stabilizing agent is a trialkylamine.

10. The method of claim 5 wherein said stabilizing agent is added in an amount of from about 0.1 to about 2% by weight of said monomer.

References Cited

UNITED STATES PATENTS

| | | | |
|---|---|---|---|
| 2,121,009 | 6/1938 | Britton et al. | 252—401 |
| 2,121,011 | 6/1938 | Britton et al. | 252—401 |
| 2,318,211 | 5/1943 | Foord | 252—401 |
| 2,318,212 | 5/1943 | Foord | 252—401 |
| 3,022,292 | 2/1962 | Sims | 260—239.3 |
| 3,036,066 | 2/1962 | Sims | 260—239.3 |
| 3,217,040 | 11/1965 | Schmerling | 252—401 |
| 3,230,257 | 1/1966 | Schmerling | 252—401 |

HENRY R. JILES, *Primary Examiner.*

R. T. BOND, *Assistant Examiner.*

U.S. Cl. X.R.

252—401; 260—294.7, 326.5